US007702411B2

United States Patent
Bagchi et al.

(10) Patent No.: US 7,702,411 B2
(45) Date of Patent: Apr. 20, 2010

(54) INTEGRATION OF JOB SHOP SCHEDULING WITH DISCREET EVENT SIMULATION FOR MANUFACTURING FACILITIES

(75) Inventors: Sugato Bagchi, White Plains, NY (US); Soumyadip Ghosh, Philadelphia, PA (US); Jayant R. Kalagnanam, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 11/756,356

(22) Filed: May 31, 2007

(65) Prior Publication Data
US 2008/0300705 A1   Dec. 4, 2008

(51) Int. Cl.
*G06F 19/00* (2006.01)

(52) U.S. Cl. .................... 700/100; 700/99; 700/96; 705/8

(58) Field of Classification Search .......... 700/100, 700/99, 96; 705/8
See application file for complete search history.

(56) References Cited

U.S. PATENT DOCUMENTS 4,888,692 A * 12/1989 Gupta et al. ............. 700/96

2001/0032029 A1* 10/2001 Kauffman ............. 700/99

OTHER PUBLICATIONS

Arakawa et al., "An optimization-oriented method for simulation-based job scheduling incorporating capacity adjustment function" 2003 Elsevier B.V., p. 1-11.*
Dr. James C. Emery, "Job shop scheduling by means of simulation and an optimum-seeking search" Winter Simulation Conference, 1969, pp. 363-372.*
P. Baudet et al., "A discrete-event simulation approach for scheduling batch processes", 1995 Computers chem. Eng., pp. 1-7.*

* cited by examiner

*Primary Examiner*—Albert DeCady
*Assistant Examiner*—Tejal Gami
(74) *Attorney, Agent, or Firm*—Scully, Scott, Murphy & Presser, P.C.; Stephen C. Kaufman, Esq.

(57) ABSTRACT

A method and system for integrating job shop scheduling with discrete event simulation for manufacturing facilities are provided. In one aspect a simulator simulates discrete events of a facility using a job schedule generated by a scheduler. The simulator simulates the facility based on one or more local rules, one or more resources, and one or more parameters associated with said locals rules and said resources. The simulator further models said one or more parameters as random variables and using said random variables in its simulation of the facility. The scheduler receives feedback based on output from the simulating step. The feedback includes at least an instruction to the scheduler to include at least one of said one or more resource and to change said one or more parameters based on said modeling of said one or more parameters as random variables. The scheduler uses the feedback for generating an updated schedule.

6 Claims, 2 Drawing Sheets

INTEGRATION OF JOB SHOP SCHEDULING WITH DISCREET EVENT SIMULATION FOR MANUFACTURING FACILITIES

FIELD OF THE INVENTION

The present disclosure relates generally to simulation methods and particularly to development of robust job shop scheduling for manufacturing facilities by integration with discrete event simulation.

BACKGROUND OF THE INVENTION

Job-shop scheduling optimization tools attempt to schedule various jobs for processing on various available resources in the most optimal way possible. However, in order to remain computationally tractable, job-shop scheduling optimization problems take into consideration only a sub-set of all resources needed to run operations in a manufacturing facility. For example, all tools or stations in a shop floor may be taken into account, but all material handling systems might be ignored. While one could design the material handling system, e.g., with cranes, transfer cars, guided automated vehicles etc., to have a capacity much higher than the overall throughput capacity of the stations in the floor, in reality physical space availability and complexity of movement constraints often limit the capacity of the material handling system to be equal to or slightly above the capacity of the rest of the system.

Resources are ignored in the formulation of a scheduler either because their effect on the scheduling is perceived to be minimal or because they are more complex to model compared to a fixed-location machine. For example, if the jobs are moved from a machine to the next resource using cranes on the same rail, then the location and status of each crane has to be tracked in order to serve a move request. This increases the scheduling problem size to intractable levels.

Another simplifying assumption made in job-shop scheduling is to assign deterministic values for many parameters that actually are considered to have random values. While many machine operations can be controlled to the point where they are essentially deterministic some values like "good yield of a chemical process", "time taken to move between machine A and B" etc. are much harder to predict due to the complexity of manufacturing units and material handling systems. Thus those values are better treated as random variables. However, most scheduling optimization formulations do not handle them as random parameters because of computational time constraints.

As a result of the limitations discussed above schedules generated from job-shop scheduling formulations might not be viable in terms of their applicability to the actual manufacturing facility. For instance, the assumed travel time between stations might not always be feasible, which may lead to disruptions in the order of processing the jobs as prescribed in the generated schedule. Since job-shop schedulers are typically used when the sequence of operations and their particular timing constraints are crucial to production, this can lead to significant wastage and increased cost of operations.

To illustrate these problems, consider the operation of a steel plant. Different sub-divisions of a steel plant are usually operated with the help of sophisticated optimization-based schedulers. Crucial manufacturing constraints like sequencing of similar grades of steel lots together to avoid costly set-up times, sequencing the next operation within a preset time-window after completion of current operation in order to avoid cool-down of molten metal etc. are best handled by a scheduler using an optimization-based formulation of these constraints and objectives. However, important resources like the cranes and transfer cars needed to move large ladles filled with molten metal, and the ladles themselves are not included in the formulation. Often, the stochasticity inherent in the arrival times of molten metal from the blast furnace, the time taken to get a free crane or transfer car, and the time to move between machines etc. are ignored and these parameters assumed deterministic. If these variables are assigned to poor deterministic values that are often violated in the real world, the resultant schedule might often break when applied. This will lead to lots not arriving at locations close to their assigned times, resulting in breaks in long sequences, increased machine idle time, and the need for re-processing to heat up cold metal.

Michael C. Fu, 2002, Optimization for Simulation: Theory vs. Practice, *INFORMS Journal on Computing* Vol. 14, No. 3, pp. 192-215; Andradóttir, S. 1998. Simulation optimization. Chapter 9 in J. Banks, ed. *Handbook of Simulation: Principles, Methodology, Advances, Applications, and Practice*. John Wiley & Sons, New York; Andradóttir, S. 2006. An overview of Simulation optimization via random search. Chapter 20 in S. G. Henderson and B. L. Nelson, eds. *Simulation: Handbook in Operations Research and Management Science Vol* 13. Elsevier, Amsterdam, survey using simulations to evaluate the candidate solutions produced by an optimization formulation. The methods described there, however, use the simulation to simply evaluate how good a candidate solution is. They specifically do not use the information provided to change the optimization formulation itself; the information is instead used simply to guide the search for a better candidate using the same formulation.

J. Atlason, M. A. Epelman and S. G. Henderson. 2002. Call center staffing with simulation and cutting plane methods. *Annals of Operations Research* 127, 333-358, describes a procedure to use simulation to change certain parameters in an optimization formulation. In that procedure, however, the structure of the formulation remains static, only the coefficients or parameters of the model are changed given new information. That procedure also does not broaden the formulation by modeling previously left-out resources of the system, for example, based on simulation results.

BRIEF SUMMARY OF THE INVENTION

A method and system for enhancing job shop scheduling formulations to generate robust schedules by integrating with discrete event simulation for manufacturing facilities are provided. The method in one aspect may comprise simulating a facility with a discrete event simulator, using job schedules generated by a scheduler. The simulator simulates the facility based on one or more local rules, one or more resources, and one or more parameters associated with said locals rules and said resources. The simulator further models said one or more parameters as random variables and using said random variables in its simulation of the facility. The method further includes providing a feedback to the scheduler based on output from the simulating step. The feedback includes at least an instruction to the scheduler to include at least one of said one or more resource and to change said one or more parameters based on said modeling of said one or more parameters as random variables. The scheduler uses the feedback for updating its optimization model and generating an updated schedule.

A system for integrating job shop scheduling with discrete event simulation for manufacturing facilities, in one aspect, may comprise a scheduler module operable to provide a job schedule for a facility, a simulator module operable to simulate discrete events of a facility using the job schedule generated by the scheduler. The simulator simulates the facility based on one or more local rules, one or more resources, and one or more parameters associated with said locals rules and said resources. The simulator further models said one or more parameters as random variables and uses the random variables in its simulation of the facility. The system may further include an analysis module operable to provide a feedback to said scheduler based on output from the simulator, said feedback including at least an instruction to the scheduler to include at least one of said one or more resource and to change said one or more parameters based on said modeling of said one or more parameters as random variables. The scheduler uses the feedback for generating an updated schedule.

Further features as well as the structure and operation of various embodiments are described in detail below with reference to the accompanying drawings. In the drawings, like reference numbers indicate identical or functionally similar elements.

DETAILED DESCRIPTION

The method and system of the present disclosure in one embodiment integrates scheduling with a simulation model and simulation to produce viable schedules by including changes and other feedback suggested by the simulator within the scheduling algorithm. This allows a clear illustration of the impact of un-modeled random variables, resources and dispatching policies on the robustness of the schedule. The method and system of the present disclosure in one embodiment also allows a plant designer to identify plant design measures that could reduce variability and improve the plant's robustness in handling different schedules. The method and system may be utilized to design new production facility layouts as well as improving existing ones. Equipment makers also may use the method and system of the present disclosure to provide help on floor layout design to their prospective clients.

Figure 1:
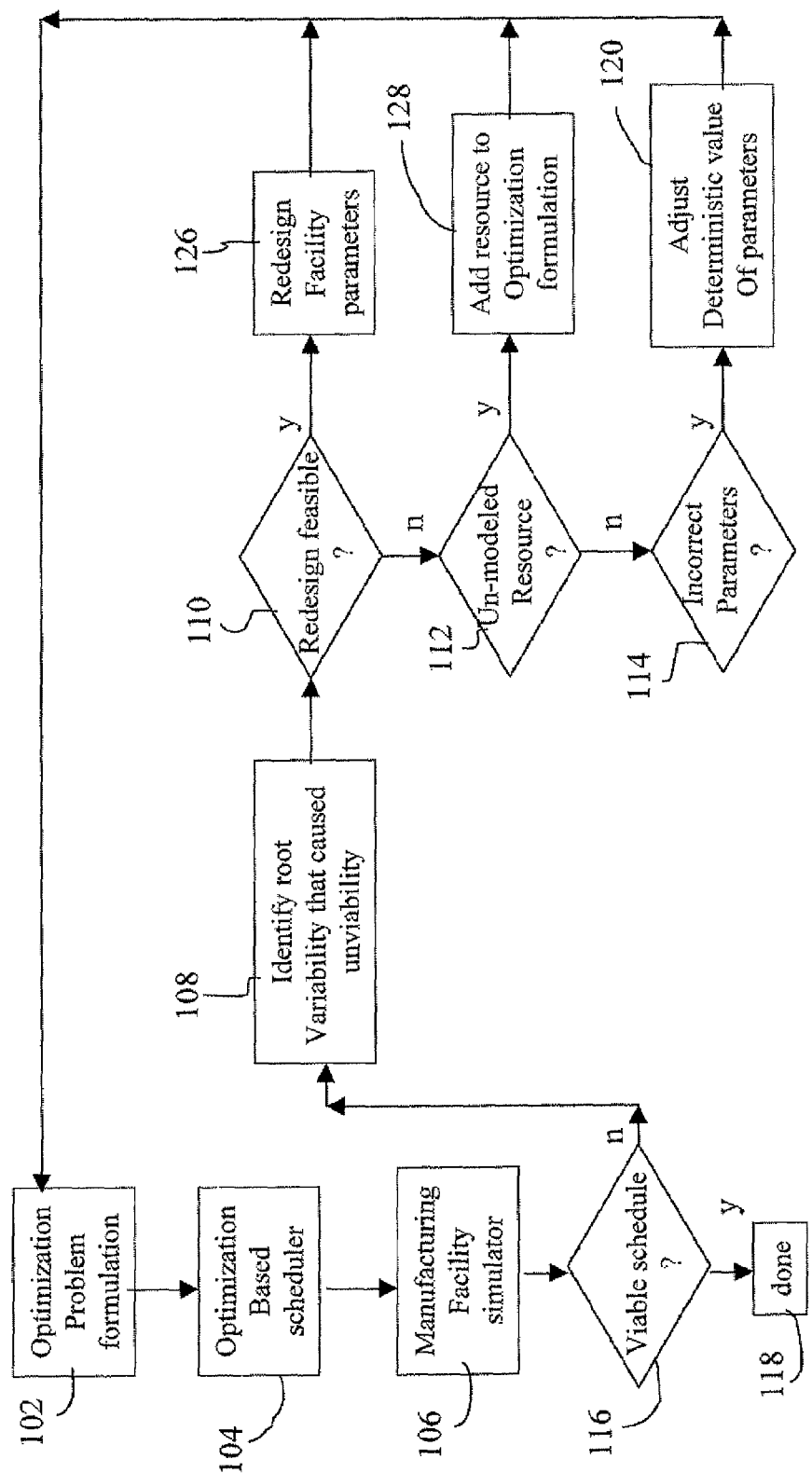
FIG. 1 is a flow diagram illustrating a method of integrating job shop scheduling with discrete event simulation in one embodiment of the present disclosure.

FIG. 1 is a flow diagram illustrating a method of integrating job shop scheduling with discrete event simulation in one embodiment of the present disclosure. The method combines a discrete event simulation model, for example, of a manufacturing facility, with an optimizing scheduler to provide an iterative approach to the formulation of the job-shop scheduling problem so as to generate realistic and viable job schedules. In one embodiment, a simulation model includes all the resources relevant to the manufacturing process, including those that are ignored by the scheduler. These are easier to include in a simulation model and simulations usually scale well with increasing complexity, unlike the optimization formulations frequently used by schedulers.

In a steel plant example, any processing station not included in the scheduling formulation, such as transportation cranes and cars (both on rails) and the molten metal carrying ladles are explicitly modeled. Since the usage of these resources is not driven by the scheduler, expert-designed local dispatch rules govern their use. A plant designer may also change these rules to determine if the simulation model can better match candidate schedules.

Referring to FIG. 1, at 104, optimization based schedule runs and the output of a scheduler, in terms of the timing and sequence of manufacturing stations to be visited by each job is fed into a simulator. A simulator may be any simulator can model simulation of a facility being run. At 106, the simulator attempts to follow the schedule while also modeling the local dispatch rules governing the use of the other resources not modeled by the scheduler. In addition, the simulation models variables appropriately as random or deterministic. Historic evidence provides a basis to choose appropriate parameters for the distribution of the random variables. A steel simulation, for instance, may consider many manual operations like loading/unloading ladles as random variables and assign to them distributions that fit the historic data well.

When the simulator fails to follow the timing and sequence prescribed in a schedule or close to that schedule, it is deemed unviable. Thus, at 116, if the schedule is not viable, 108, the method and system identifies root variability that caused unviability. In one embodiment, for example, the simulator instructs the following. At 110, if it is feasible to change the design of the facility (for example, if this analysis is being performed while the facility is being designed), the simulator can be used to determine facility parameters that can reduce the variability that caused scheduler unviability at 126. This may be increasing capacity of the resources that are not modeled in the scheduler so as to eliminate them as a bottleneck or changing the dispatch rules governing their usage. In the above-described steel plant example, increasing the number of molten steel ladles could reduce the variability in the wait times for reserving ladles. At 112, if redesigning the facility is not viable, or if the root cause of the variability is uncertainty of wait times for a resource that is un-modeled by the scheduler, the simulator instructs the scheduler to modify its model to include this previously ignored resource within the scheduler at 128. For instance, the simulator identifies which new resources should be included and provide recommendations such as "include transportation cranes in formulation." At 114, if the simulator determines that unviability is caused by an incorrect deterministic value used for a random parameter variable, the simulator may instruct the scheduler to change the representative deterministic value of the parameter to better represent the capacity of the system at 120. For example, the simulator may recommend to, "change transportation time from Machine KR to Machine DeP from 10 min to 12 min." The simulator thus may make any one or combination of the above suggestions or feedback based on its determination. Other recommendations may also be possible.

At 102, optimization is re-formulated with the feedback (for example, as shown at steps 126, 128, 120) from the simulator. At 104, the optimization based scheduler is run again, and the method repeats the above steps. This iteration procedure may continue until the scheduler can produce realistic and viable schedules that also find to be of good value. For example, at 116, if satisfactory, the process completes at 118. In this manner, the method and system of the present disclosure is able to realize the effect of the complicating factors ignored by the scheduler on generating viable schedules while not explicitly modeling them within the scheduler.

In the context of the steel industry, as an example, the order book and, e.g., the associated variability in terms of order mix and amount, may be used as input along with the available resources to manufacture these orders. Based on such input, an operation plan and schedule may be created using a production design and operational scheduling engine such as PDOS, for a specified horizon, e.g., 2 days. This schedule defines which processing stations will be visited and when, by each lot. A simulation model of the manufacturing facility is developed that includes all the resources required to perform the manufacturing operations including the floor layout and the transportation mechanisms. Using this model, the method and system of the present disclosure simulates the flow of lots throughout all the manufacturing stations in the facility, for example, including (i) allocation of ladles to store and transport molten metal, (ii) the dispatching of transportation vehicles such as cranes and transfer cars to move the ladles from one processing station to another, and (iii) the actual processing at the stations. The specification of which stations will be visited by each job and at what time is determined by the provided schedule. For resources such as ladles and transport vehicles that are outside the scope of the schedule, the simulation models the local dispatching mechanisms used to select between alternate resources or to prioritize the jobs. The schedule of operations for each resource considered by the scheduler is then compared with the simulated flow of lots through the operations and their usage of resources. The resource utilizations and wait times for the availability of resources are monitored during the simulation. The impact of resources and other variables, such as the stochastic variability in the arrivals of each lot, the time delay and variability in conveying a lot from one station to another, the availability of other resource requirements not considered by the schedule can be evaluated in terms of whether the schedule can be followed during the course of the simulation.

This analysis can be done on a rolling window of a few days over a 6-12 month horizon, for example. When a schedule becomes unviable, the simulator data is analyzed to identify the factors responsible for it. The result of this analysis updates the model used for generating an updated schedule, such as changing the facility parameters, including additional resources to be scheduled or changing the minimum delay between two consecutive operations on a lot. A new schedule is generated and evaluated with the simulator and this process is iteratively applied until a desired level of robustness is achieved by the scheduling system.

By combining a discrete event simulation of the manufacturing facility with a scheduler the viability of schedules may be evaluated and updated. A simulator implements the schedule subject to the various random variables and additional constraints present in the manufacturing facility and expose the degree of robustness or viability of the scheduler. The analysis may be performed prior to the operational deployment of the scheduler to identify some or all random variables and additional constraints that have the impact or substantial impact on the unviability of schedules. These results can be used to expand the mathematical formulation of the optimization problem, if computationally tractable; add 'hedges' to the existing formulation; and/or to reduce variabilities and constraints in the actual manufacturing facility.

Figure 2:
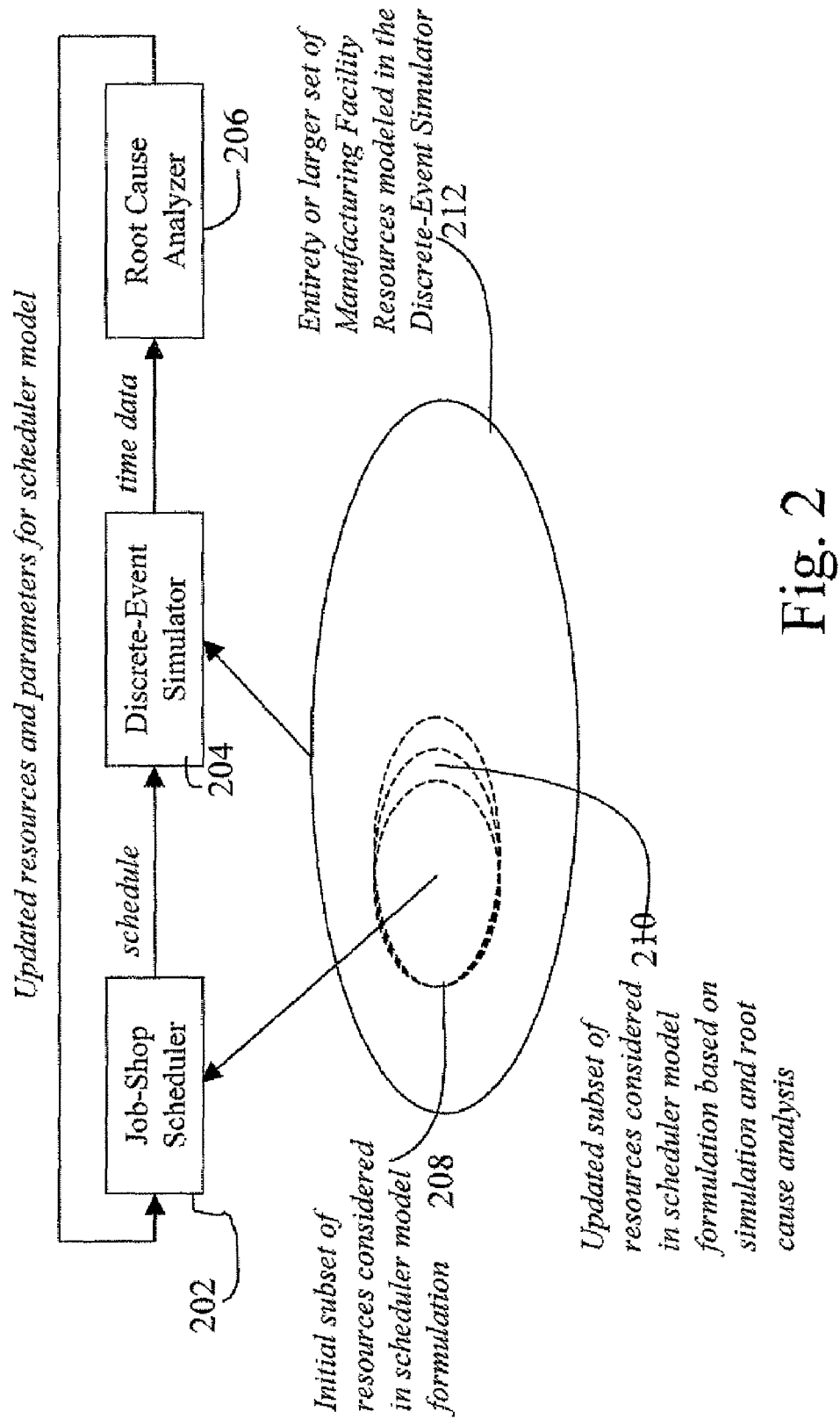
FIG. 2 is a block diagram illustrating a system comprising a job-shop scheduler, discrete event simulator and a root cause analyzer that implements one embodiment of the present disclosure.

FIG. 2 is a block diagram illustrating a system comprising a job-shop scheduler, discrete event simulator and a root cause analyzer that implements one embodiment of the present disclosure. A job scheduler module 202 produces schedules based on an initial subset of resources and initial parameter values 208 considered in its scheduler formulation model. A discrete-event simulator module 204 simulates workings of a facility using the schedule from the job scheduler module 202, and an entire or a larger set of resources and variable parameter values 212 associated with the facility. The results of the simulation are compared with the schedule produced by the job scheduler 202, and if it is determined that the schedule is unviable because it could not meet the time constraints of the job-shop, root cause analysis module 206 performs analysis and determines one or more causes for the difference. Analysis, for example, may include comparing the factors or parameters that the scheduler used differently than the simulator. Root cause analysis module 206 may then provide a feedback to the job shop scheduler 202, for example, with updated resources and parameters to use in its scheduling formulation. The job shop scheduler 202 then remodels its scheduling model based on the feedback, for example, using a different or updated set of resources and different values for parameters 210. The updated schedule output from the scheduler 202 may then be used again by the simulator 204 and the results again compared. The process performed by the job shop scheduler 202, discrete event simulator 204 and root cause analyzer 206 may repeat until a satisfactory schedule is produced by the job shop scheduler 202. A threshold that determines an acceptable or satisfactory schedule may be a design choice and may depend on individual facility that is being considered.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc. The terms "computer system" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of integrating job shop scheduling with discrete event simulation for manufacturing facilities, comprising:

simulating by a simulator discrete events of a facility using job schedule generated by a scheduler, the simulator simulating the facility based on one or more local rules, one or more resources, and one or more parameters associated with said locals rules and said resources, the simulator further modeling said one or more parameters as random variables and using said random variables in its simulation of the facility; and providing a feedback to said scheduler based on output from the simulating step, said feedback including at least an instruction to said scheduler to include at least one of said one or more resource and to change said one or more parameters based on said modeling of said one or more parameters as random variables, said feedback for said scheduler to use for updating a scheduling model associated with said scheduler and generating an updated schedule, said providing a feedback step further including determining whether the simulator followed timing and sequence prescribed in the job schedule and in response to determining that the simulator failed to follow the timing and sequence prescribed in the job schedule, comparing one or more factors that the scheduler used differently than the simulator and identifying root variability that caused the simulator to fail to follow the timing and sequence prescribed in the job schedule and the simulator instructing the schedule to at least model previously unmodeled resources in generating the updated schedule.

2. The method of claim 1, further including:
rerunning said scheduler with said feedback; and
generating a new job schedule.

3. The method of claim 2, further including:
repeating said steps of simulating, providing, rerunning and generating until said output from the simulating step indicates said new job schedule can be followed viably.

4. The method of claim 1, wherein said scheduler does not consider all of said one or more resources when initially generating said job schedule.

5. The method of claim 1, wherein said scheduler uses deterministic values for said one or more parameters.

6. A system for integrating job shop scheduling with discrete event simulation for manufacturing facilities, comprising:
a scheduler module provides a job schedule for a facility;
a simulator module simulates discrete events of a facility using the job schedule generated by the scheduler, the simulator simulating the facility based on one or more local rules, one or more resources, and one or more parameters associated with said locals rules and said resources, the simulator further modeling said one or more parameters as random variables and using said random variables in its simulation of the facility, an analysis module provides a feedback to said scheduler based on output from the simulator, said feedback including at least an instruction to the scheduler to include at least one of said one or more resource and to change said one or more parameters based on said modeling of said one or more parameters as random variables, said feedback for the scheduler to use for updating a scheduling model associated with said scheduler and generating an updated schedule, said analysis module provides a feedback further determining whether the simulator followed timing and sequence prescribed in the job schedule and in response to determining that the simulator failed to follow the timing and sequence prescribed in the job schedule, comparing one or more factors that the scheduler used differently than the simulator and identifying root variability that caused the simulator to fail to follow the timing and sequence prescribed in the job schedule, and the simulator instructing the schedule to at least model previously unmodeled one or more resources in generating the updated schedule.

* * * * *